(No Model.)　　　　　　　　　　　　　　　　3 Sheets—Sheet 1.
J. T. LEE.
BOLTING CHEST AND MIDDLINGS PURIFIER.
No. 321,441.　　　　　　　　　　　Patented July 7, 1885.

Figure 1:
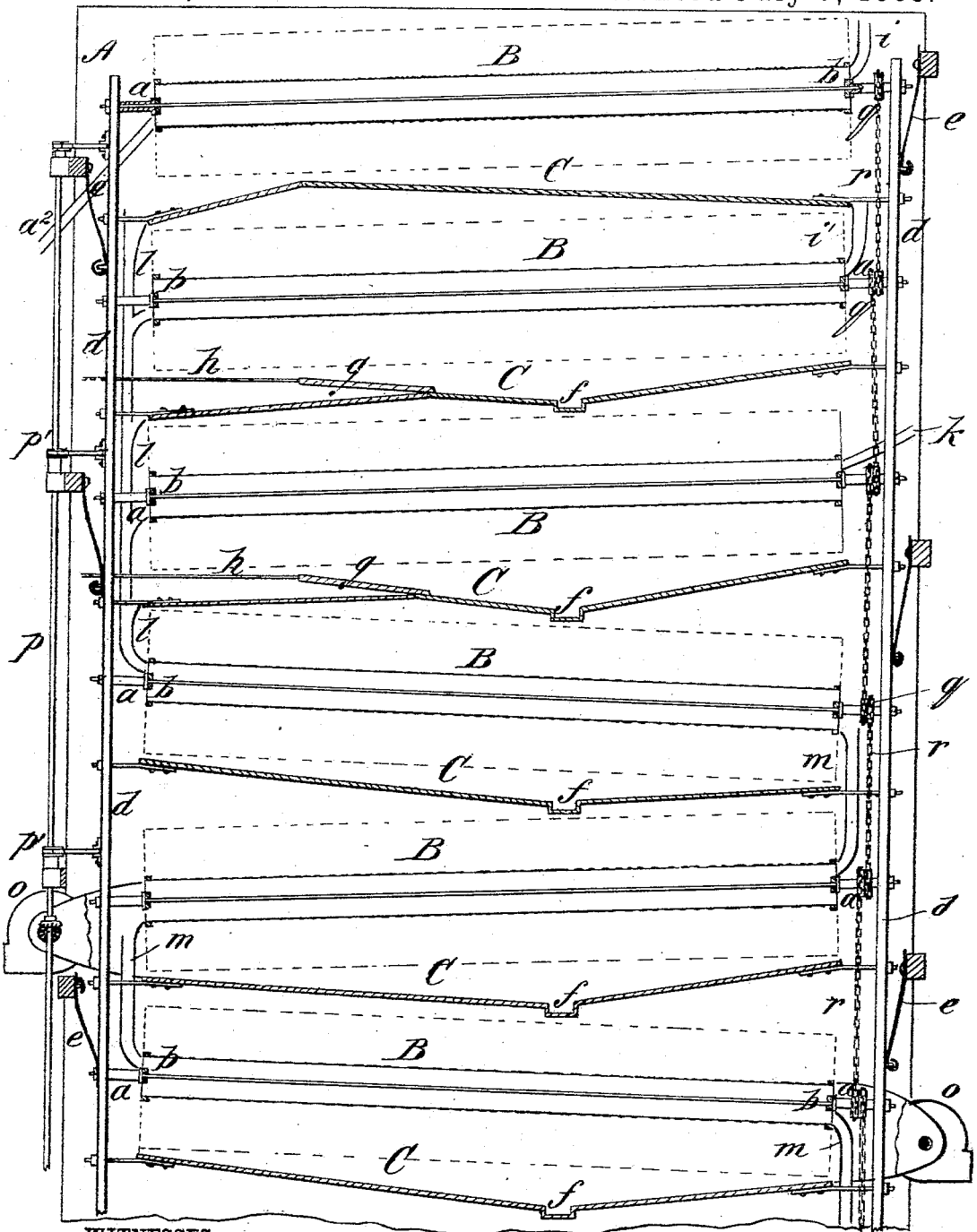

WITNESSES:　　　　　　　　　　　　　　INVENTOR:
Donn Twitchell.　　　　　Fig. 1.　　　J. T. Lee
C. Sedgwick　　　　　　　　　　　BY Munn & Co.
　　　　　　　　　　　　　　　　　　ATTORNEYS.

(No Model.) 3 Sheets—Sheet 2.

J. T. LEE.
BOLTING CHEST AND MIDDLINGS PURIFIER.

No. 321,441. Patented July 7, 1885.

WITNESSES:
Donn Twitchell
C. Sedgwick

INVENTOR:
J. T. Lee
BY Munn & Co.
ATTORNEYS.

(No Model.) 3 Sheets—Sheet 3.

J. T. LEE.
BOLTING CHEST AND MIDDLINGS PURIFIER.

No. 321,441. Patented July 7, 1885.

WITNESSES:
Dom Twitchell
C. Sedgwick

INVENTOR:
J. T. Lee
BY Munn & Co.
ATTORNEYS.

UNITED STATES PATENT OFFICE.

JULIUS T. LEE, OF DRYDEN, MICHIGAN.

BOLTING-CHEST AND MIDDLINGS-PURIFIER.

SPECIFICATION forming part of Letters Patent No. 321,441, dated July 7, 1885.

Application filed July 3, 1884. (No model.)

*To all whom it may concern:*

Be it known that I, JULIUS T. LEE, of Dryden, in the county of Lapeer and State of Michigan, have invented a new and Improved Bolting-Chest and Middlings-Purifier, of which the following is a full, clear, and exact description.

The object of my invention is to accomplish with one machine the work of bolting and purifying flour and middlings. I make use of two or four sided screens, which are given an end shake for causing the sifting of the material, and which are turned at suitable intervals, so as to change the screen-surface in use. I also employ cant-boards for grading the sifted material, all as hereinafter described and claimed.

Reference is to be had to the accompanying drawings, forming part of this specification, in which similar letters of reference indicate corresponding parts in all the figures.

Figure 2:
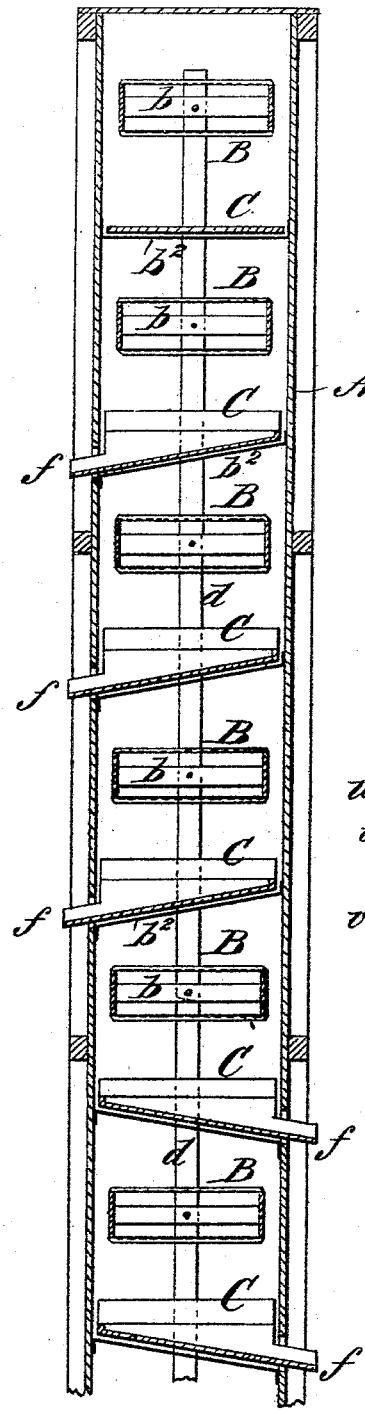
Figure 4:
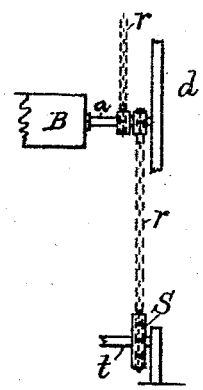
Figure 3:
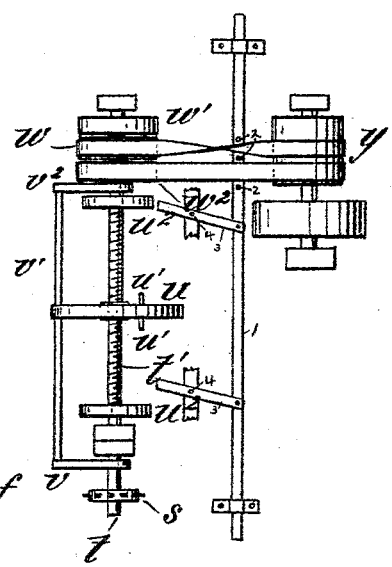
Figure 5:
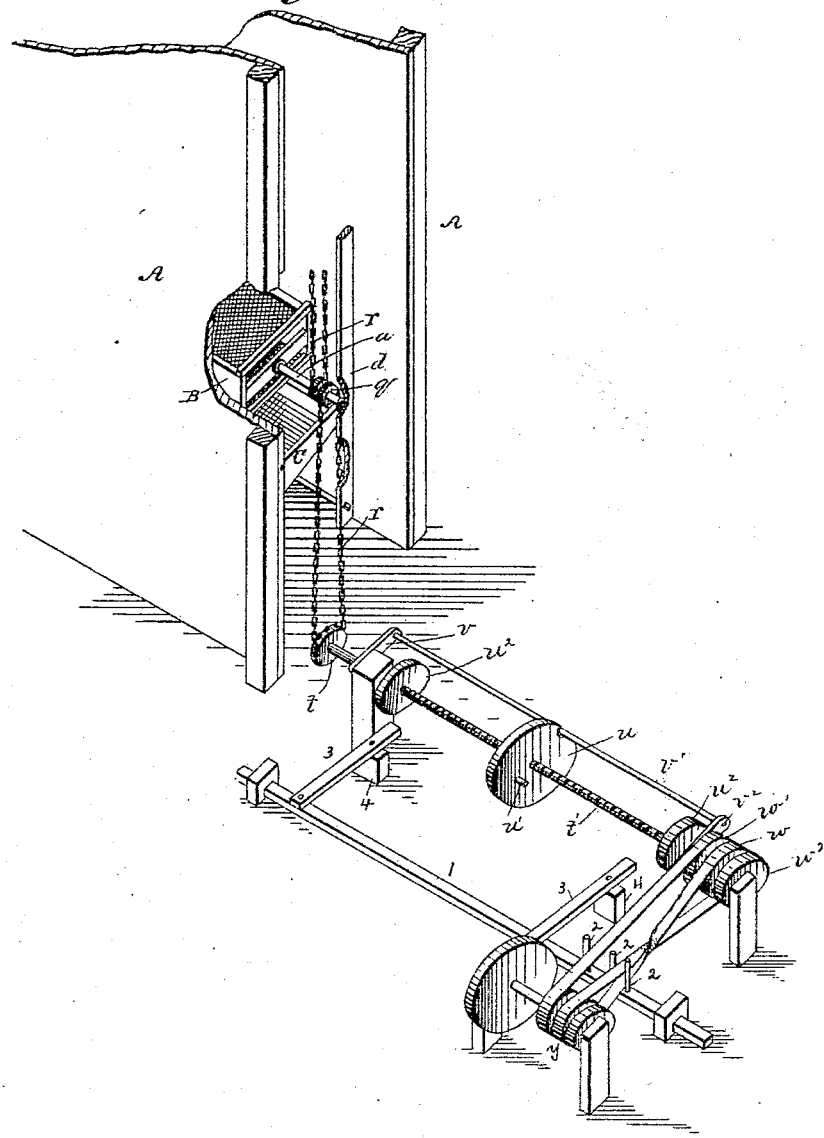

Figure 1 is a vertical longitudinal section of the machine. Fig. 2 is a vertical transverse section. Fig. 3 is a detail view of the automatic mechanism. Fig. 4 is a detail view showing the connection between the belt-shifting mechanism and the screens. Fig. 5 is a perspective view of a portion of the lower part of the machine and the belt-shifter, showing their construction.

The case A contains the series of screens B, arranged in a vertical tier with intervening cant-boards, C. The screens shown are constructed of flat form, the two wider sides formed of bolting-cloth, wire-cloth, or similar material, and the narrower sides closed. They may, however, be square, with cloth on each of the four sides.

The screens are supported on shafts $a$ $a$ at their ends by cross-bars $b$, and the shafts are journaled at their outer ends in vertical side bars $d$, that are suspended in the case A by springs $e$ $e$. The cant-boards C are rigidly connected to the end bars $d$ for their support, and so that they shall partake of the shaking motion. They are also inclined suitably to carry off the middlings and flour separately, and those below the upper one have spouts $f$, extending sidewise to carry the flour out of the chest.

In order to shorten and lengthen the incline, so as to carry out more or less of the flour, I provide adjustable inclines $g$, fitted for being moved in and out by rods $h$, extending to the outside.

$i$ is a feed-spout to the interior of the top screen.

$a^2$ is the bran discharge spout of the top screen.

$i'$ is a spout from the upper cant-board for conveying the flour to the second screen.

$l\ l\ l$ are spouts from the upper cant-boards, to convey the middlings to the lower flour-screens.

$k$ is a spout for delivering ground middlings to one of the flour-screens. The lower flour-screen and the middlings-screens below connect by spouts $m$, so that the material passes from one to the other while being graded and purified.

In connection with the lower screens, suction-fans $o$ $o$ are provided for drawing out the fluff and delivering it outside of the case.

In order to oscillate and turn the screens, a vertical shaft, $p$, is fitted at the end of the case, and has cranks or eccentrics $p'$, connected by rods to the end bars $d$, so that when the shaft is rotated all the screens and cant-boards will be given an end shake.

On shafts $a$, at one end of the screens, are chain-wheels $q$, around which and from one to the other passes a chain, $r$, that connects at its lower end with a chain-wheel, $s$, on a shaft, $t$, of the shifting mechanism, (shown in Figs. 3, 4, and 5,) which will be placed in a convenient position below the case. The shifting may be done by hand or automatically by the devices shown.

$t'$ is a screw-shaft extending from the end of shaft $t$ and carrying a flange or disk-nut, $u$, which has pins $u'$ for engaging holes or notches in disks $u^2$, that are fixed on the ends of the screw-shaft.

$v$ is a crank-arm on shaft $t$, connected by a rod, $v'$, with an arm, $v^2$, loose on shaft $t'$, the rod also passing through a hole or notch in the flange of nut $u$.

$w$ is a loose pulley between two fast pulleys, $w'$ $w^2$, on the shaft $t'$, and there are two belts, one straight and one crossed from a driving-pulley, $y$, to the fast and loose pulleys.

When in the rotation of shaft $t'$ the nut $u$ reaches one end of the shaft, it locks with the disk $u^2$ at that end, and consequently turns with the shaft, carrying with it rod $v'$ and crank-arm $v$, thereby giving a semi-rotation to shaft $t$ and causing the screens to turn over. At the same time the bar 1, provided with pins 2 on each side of the belts, is moved by the nut $u$, acting on one of the levers 3, pivoted to the bar 1 and to fixed supports 4, to carry one belt upon the loose pulley and the other one upon the other fast pulley, thereby reversing the motion of the screw-shaft and causing the nut to move to the other end.

The mechanism is to be timed to give the screens a turn at intervals of, say, from ten to thirty minutes. The effect is to bring the upper screen-surface down to the bottom into position for use, while the surface previously in use goes to the top, and any bran or material that may be in the meshes will be caused to drop out by the shake of the screen, aided by suitable knockers, if required.

The screens are thus self-cleaning, and they also act more effectively than common reels, as they allow the flour to drop straight downward.

I have shown at $b^2$ in Fig. 2 cross-partitions to prevent the material from dusting down upon the screens from above at the ends of the cant-boards. A partition running vertically from the top to the bottom sieve may be used for the same purpose, and perforated to allow of the air-currents.

Having thus described my invention, what I claim as new, and desire to secure by Letters Patent, is—

1. In a bolting-chest, the combination, with a casing, of a series of hollow screens provided with opposite screen-faces and arranged one above the other, and mechanism for vibrating and intermittently rotating the same, substantially as herein shown and described.

2. In a bolting-chest, the combination, with a casing, of a series of hollow screens having opposite screen-faces, and means for rotating all the screens simultaneously to bring either face into use, substantially as herein shown and described.

3. In a bolting-chest, the combination, with a casing, of vertical bars, the hollow screens, their shafts journaled in said bars, and means for oscillating said bar, substantially as herein shown and described.

4. In a bolting-chest, the combination, with the casing A, the vertical bars $d$, and springs $e$ for supporting said bars, of the shafts $a$, the screens B, the shafts $p$, provided with crank-arms $p'$, connected to the bars $d$, and means for operating said shafts, substantially as shown and described.

5. In a bolting-chest, the combination, with the casing A, the spring-supported bars $d$, the crank-shaft $p\ p'$, and means for operating the said shaft, of the shafts $a$, the screens B on said shafts, and means for intermittingly rotating the screens, substantially as herein shown and described.

6. In a bolting-chest, the combination, with the casing A, the end bars, $d$, and means for vibrating the same, of the screens B, journaled in said bars, the cant-boards C, rigidly secured to said bars below the screens, and means for imparting an intermittent rotary movement to the screens, substantially as herein shown and described.

7. In a bolting-chest, the combination, with the casing A, the shafts $a$, provided with the chain-wheels $q$, the screens B on said shafts, and the chain, $r$ of the shaft $t$ of the belt-shifter, provided with the chain-wheel $s$, substantially as herein shown and described.

JULIUS T. LEE.

Witnesses:
JOHN RATTRAY,
JOSEPH MANWARING.